May 8, 1945.  H. E. MALONE ET AL  2,375,234
CONTROL APPARATUS
Filed Jan. 12, 1942   3 Sheets-Sheet 1
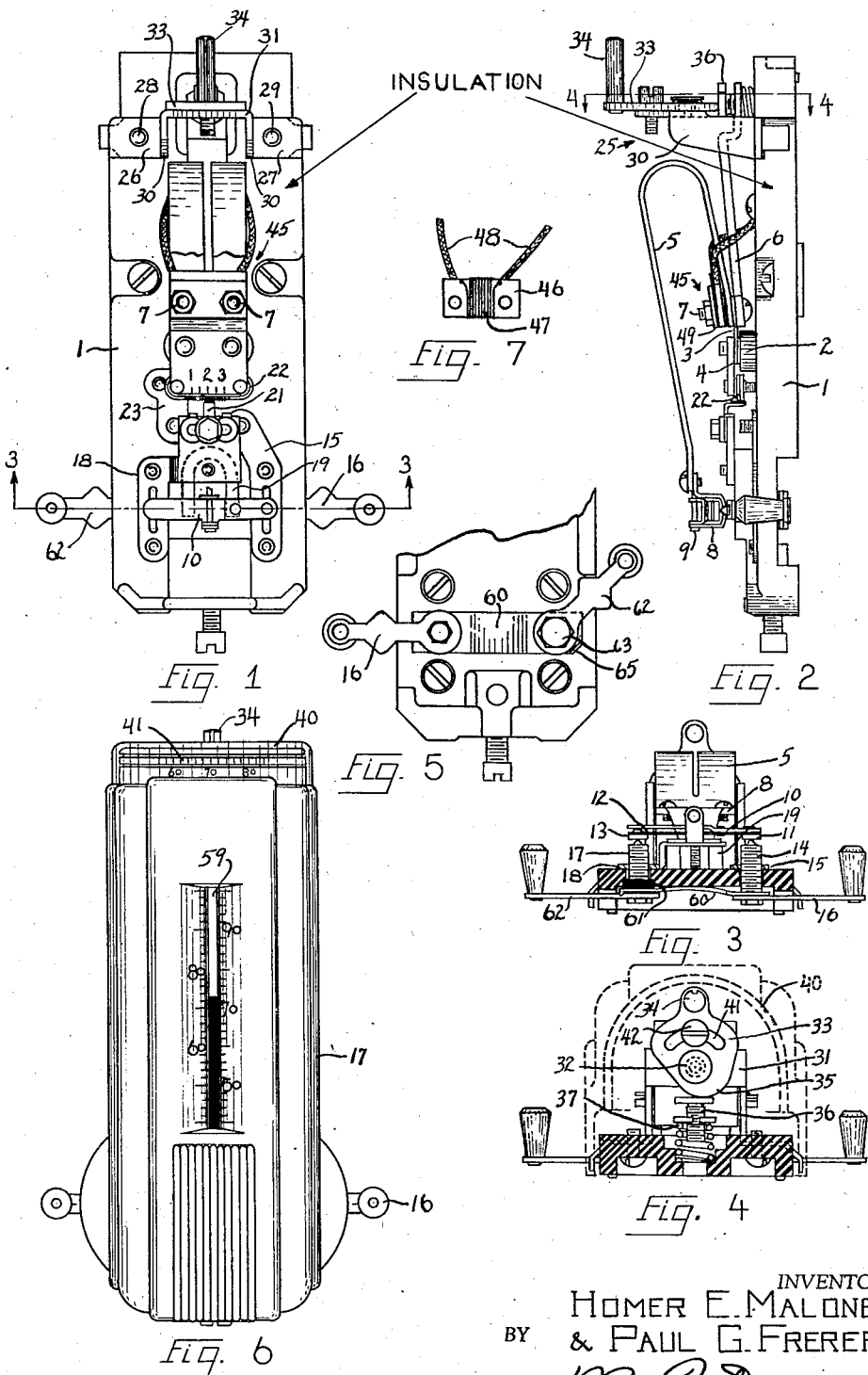
INVENTOR.
HOMER E. MALONE
& PAUL G. FRERER
BY
ATTORNEY.

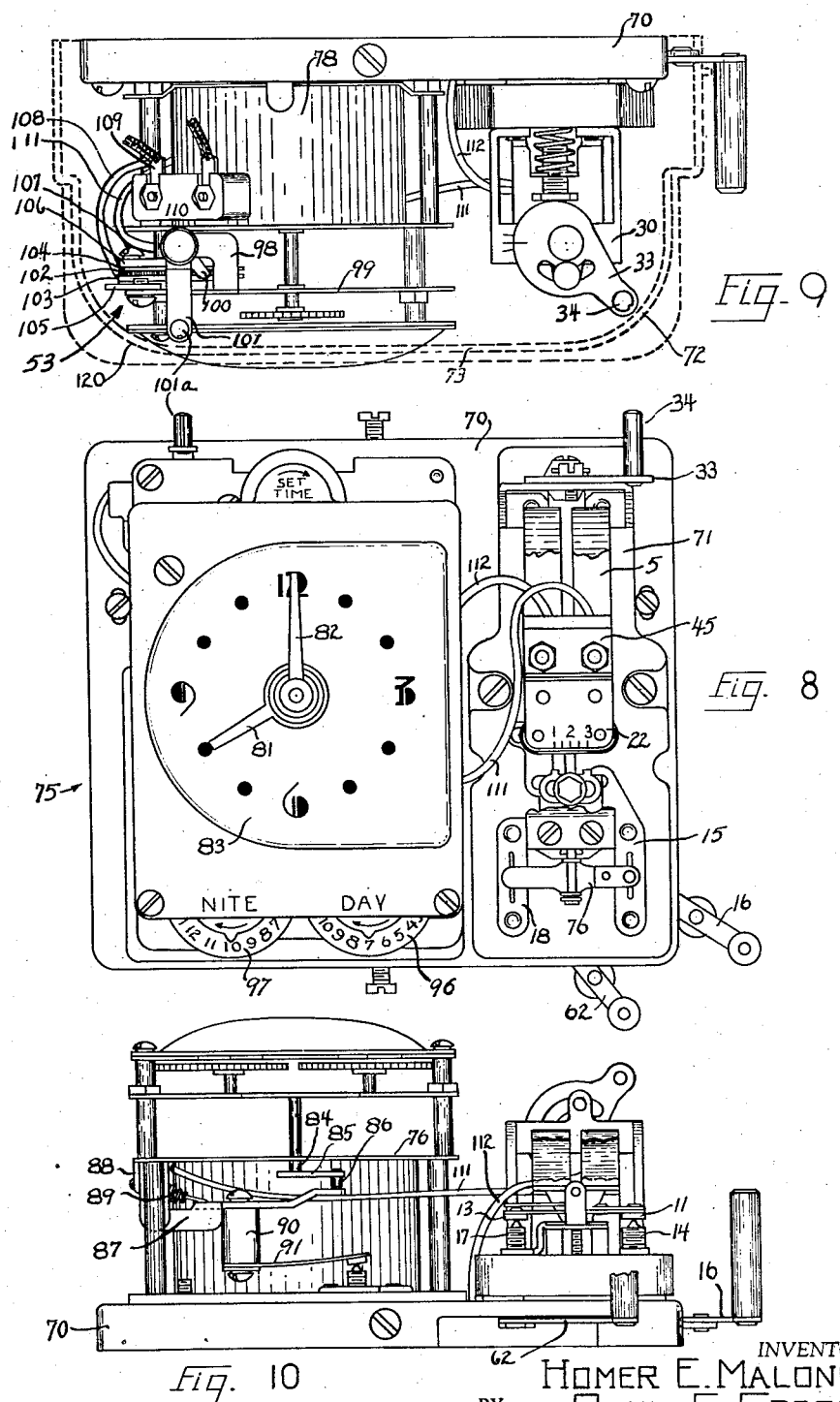

May 8, 1945.   H. E. MALONE ET AL   2,375,234
CONTROL APPARATUS
Filed Jan. 12, 1942   3 Sheets-Sheet 3
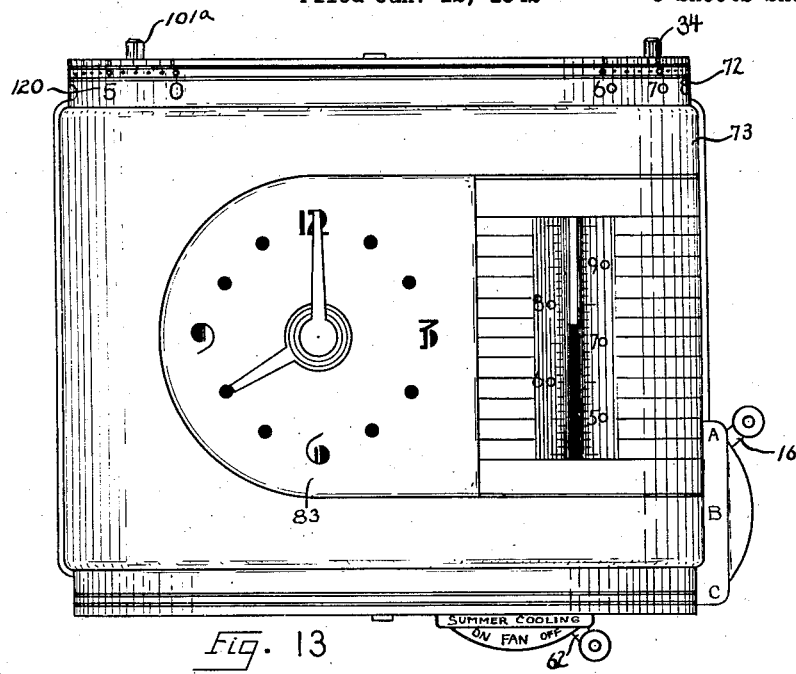
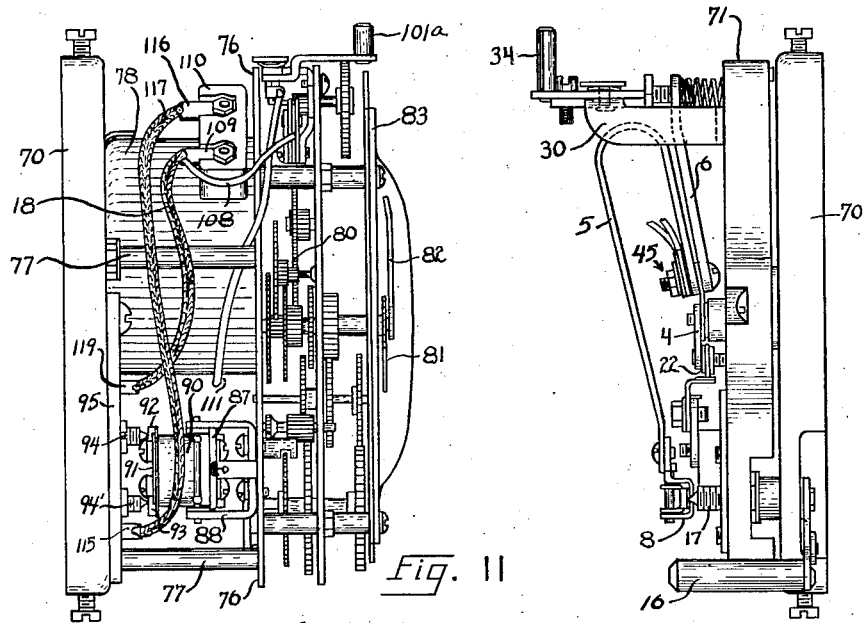
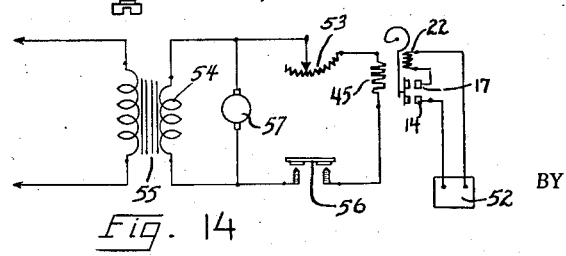
INVENTOR.
HOMER E. MALONE
& PAUL G. FRERER
BY
ATTORNEY.

Patented May 8, 1945

2,375,234

UNITED STATES PATENT OFFICE 2,375,234

CONTROL APPARATUS

Homer E. Malone and Paul G. Frerer, Milwaukee, Wis., assignors to Perfex Corporation, Milwaukee, Wis., a corporation of Wisconsin Application January 12, 1942, Serial No. 426,424

5 Claims. (Cl. 200—122)

This invention relates in general to automatic controls, and more particularly to room temperature responsive controls which are adapted to maintain one value of temperature at one period of time and a different value of temperature at a different period of time.

It is an object of this invention to provide a room thermostat which is simple and rugged in construction, which has a neat and attractive exterior appearance and which provides for maintaining a lower temperature during periods of unoccupancy without requiring manual adjustment.

In accordance with the present invention, the lowering of temperature during periods of unoccupancy is obtained by means of an electric heater, this heater being selectively energized or deenergized for varying the temperature maintained by the thermostat. In the past this method of varying the temperature maintained by the thermostat has had the objectionable feature of destroying the accuracy of the usual thermometer mounted on the thermostat cover. Thus in the prior art devices when the heater is deenergized, the thermometer will read accurately. However, when the heater is energized, the heater influences the thermometer and causes it to read higher than the actual room temperature. It is another object of this invention to provide a room thermostat employing a heater for varying the control point of the thermostat without materially influencing the thermometer. More particularly, it is an object of this invention to provide a control point adjustment for a room thermostat consisting of a heater mounted directly upon the thermostatic element and transmitting heat by direct conduction to the thermostatic element.

A further object of the invention is the provision of a room thermostat with two conveniently accessible control point adjustments, one adjustment varying the temperature maintained at one period of time and the other adjustment varying the temperature maintained during another period of time, these adjusting devices comprising lever members cooperating with curved portions of the thermostat cover for indicating the adjustments.

Another object of the invention consists in the provision of a simple and accurate mechanism for mechanically varying the control point of a thermostat or condition responsive device.

A further object of the invention is the provision of a simplified manual switching mechanism for a room thermostat or condition responsive device.

Other objects of the invention will become apparent from the following description and the appended claims.

For a full disclosure of this invention, reference is made to the following detailed description and to the accompanying drawings, in which Fig. 1 is a front view of one form of thermostat embodying the invention, the cover being removed;

Fig. 2 is a side view of the thermostat of Fig. 1;

Fig. 3 is a partly sectional view taken on line 3—3 of Fig. 1 and looking in the direction of the arrows;

Fig. 4 is a partly sectional view taken on line 4—4 of Fig. 2;

Fig. 5 is a fragmentary rear view of the device showing the manual switch mechanism;

Fig. 6 is a front view of the cover for the thermostat shown in Fig. 1;

Fig. 7 is a front view of the set-back heater;

Fig. 8 is a front view, with the cover removed, of another embodiment of the invention in which the clock and thermostat are combined into a single unit;

Fig. 9 is a top view of the thermostat of Fig. 8;

Fig. 10 is a bottom view of the same thermostat;

Fig. 11 is a left hand side view of the clock thermostat;

Fig. 12 is a right hand side view of the device, certain parts being omitted for clearness;

Fig. 13 is a front view of the clock thermostat cover; and

Fig. 14 is a typical wiring diagram for both forms of the invention disclosed.

Referring particularly to Figs. 1 and 2, reference character 1 indicates a base member which is adapted for mounting upon the wall of a room. This base member is preferably formed of insulation material and is provided with a raised portion 2 near its center, upon which a spring hinge 3 is secured by means of a clamping member 4. The other end of the spring hinge 3 is secured to a U-shaped bimetal element 5 and an adjusting arm 6 by means of screws 7. The U-shaped bimetal element 5 at its free end carries a generally U-shaped armature bracket 8, and also carries a pivot pin 9 which pivotally mounts a movable contact bracket 10. The bracket 10 is pivoted at its center and at one end carries a movable contact 11 and a flexible arm 12, this flexible arm at its other end carrying a second movable contact 13. The movable contact 11 is adapted to engage a fixed contact stud 14 which is screwed into a bracket 15 mounted on base member 1. The rear end of the stud 14 is secured to an adjusting lever 16 which projects beyond the base, and also beyond the thermostat cover 17 mounted on the base. The movable contact 13 cooperates with a fixed contact stud 17 which is screwed into a bracket 18 mounted on base 1. As shown in Fig. 3, the bracket 18 has an off-set portion extending outwardly from the base, this bracket then extending parallel to the base and securing a permanent magnet 19 to the base in cooperative relationship with the armature bracket 8. The portion of bracket 18 which covers the permanent magnet 19 is slotted to receive an adjustable slider 21 which engages an electric heater 22 mounted on the clamping bracket 4. This heater 22 transmits heat by conduction through the clamping plate 4 and spring hinge 3 to the bimetal element 5. By shifting the slider 21 along the turns of heater 22, the heating effect of this heater may be varied. The other terminal for the electric heater is connected to a terminal bracket 23 mounted upon the base 1 which carries a suitable terminal screw (not shown). The bracket 15 is connected to another suitable terminal screw.

From the description thus far it will be apparent that when the movable contacts 11 and 13 are in engagement with their respective fixed contacts 14 and 17, a circuit is completed from the terminal bracket 15 through stud 14, contact 11, flexible arm 12, contact 13, stud 17, bracket 18, slider 21 and heater 22 to the terminal bracket 23. Thus a circuit is completed from one terminal bracket to the other and at the same time the heater is energized. This transmits heat to the thermostatic element, causing it to rise in temperature, this building up a stress within the bimetal tending to move the movable contacts away from the fixed contacts. Initially this movement is prevented by the attraction of the armature 8 to the permanent magnet 19. When the internal stress in element 5 becomes sufficient to overcome the attraction of the magnet 19, the contacts disengage with snap action. Thus the circuit through the thermostat is broken and also the heater 22 becomes deenergized. When the thermostatic element 5 cools down, the movable contacts approach the fixed contacts slowly until the magnetic attraction becomes sufficient to reclose the contacts with snap action. The adjusting lever 16 which screws the fixed contact stud 14 in and out serves to vary the distance between the armature 8 and the permanent magnet, when the contacts are closed. This determines the differential of the instrument and serves to vary the length of the "on" periods provided by the thermostat.

No novelty is claimed in the thermostat construction so far described, this construction being clearly disclosed in the Lindemann Patent 2,250,135. For a more complete description on the construction and operation of this thermostat mechanism, reference is made to this Lindemann patent.

Near the top of the base 1 is a mounting bracket 25 for the control point adjusting mechanism. This mounting bracket is provided with end portions 26 and 27 which are secured to the base 1 by screws 28 and 29, these end portions merging into outwardly extending legs 30 which support a horizontal cross piece 31. This cross piece 31 carries a pivot pin 32 which pivotally mounts a lever member 33 intermediate its ends. This lever member is provided with a handle portion 34 at its outer end, and with a cam or eccentric surface 35 at its inner end. This cam surface 35 is engaged by a calibrating screw 36 carried by the end of adjusting arm 6, the end of this arm being slit as shown for locking the calibrating screw 36 in adjusted position. The base 1 is recessed opposite the upper end of adjusting arm 6 for receiving a biasing spring 37 which maintains the calibrating screw 36 in engagement with the cam surface 35. It will be apparent that rotation of the adjusting lever 33 about its pivot will move the adjusting arm 6 inwardly or outwardly about the spring hinge 3, this causing similar rotation of the thermostatic element 5. Thus movement of the lever 33 serves to adjust the control point of the instrument. The top of the thermostat cover 17 is provided with an arcuate front portion 40 which is adjacent the handle portion 34 and which is concentric with the path of travel of this handle portion. This arcuate portion 40 of the cover is provided with indicia 41 which cooperates with the handle portion 34 in indicating the adjustment of the instrument. In order to limit the movement of lever 33, this lever is provided with an arcuate slot 41 which receives a screw 42 carried by cross member 31. This screw 42 is ordinarily left loose, which permits free movement of lever 33 within the limits provided by slot 41. If it is desired to lock the thermostat adjustment, screw 42 may be tightened.

In order to vary the control point of the instrument during periods of unoccupancy, a heater 45 is clamped to the bimetal element 5 adjacent the spring hinge 3. This heater preferably consists of a plate 46 of heat resisting electrical insulating material upon which is wound a coil 47 of resistor wire, the ends of this wire being connected by leads 48 to suitable terminals on the base 1. The plate 46 is held in place by the screws 7, a clamping plate 49 preferably being interposed between the heater and the nuts on the screws. As shown in Fig. 2, suitable strips of insulating material, such as mica, are located on each side of the coil 47 between clamping plate 49 and bimetal element 5 for the purpose of preventing short-circuiting of the coil.

A typical wiring diagram for an instrument of this type is shown in Fig. 14. As shown in this figure, the fixed contacts 14 and 17 are connected in series with the anticipating heater 22 to the control terminals of a primary control 52 which controls a burner. The heater 45 is connected in series with a suitable rheostat 53 across the secondary 54 of a step-down transformer 55 which is continuously connected across a source of power. The heater 45 is also connected in series with a switch 56 operated by a timing device driven by a small synchronous motor 57. The time switch 56 is open during periods of occupancy which causes the heater 45 to be deenergized. As a result the thermostat serves to maintain a temperature as determined by the adjustment of handle portion 34. During periods of unoccupancy the time switch 56 is closed, which energizes the heater 45. This applies false heat to the thermostatic element and causes the thermostat to remain a lower room temperature. By adjusting the rheostat 53, the amount that the thermostatic element is heated above ambient temperature may be varied. This rheostat 53 thus determines the amount that the room temperature is reduced during periods of unoccupancy.

Referring again to Fig. 2, it will be noted that the heat from heater 45 is transmitted by direct conduction to the bimetal element 5. It will also be noted that a relatively cool portion of the bimetal element 5 is interposed between the heater and the rear of the thermostat cover upon which the thermometer 59 is mounted. This arrangement, in which the heat is transmitted from the heater to the bimetal by direct conduction, avoids the necessity of heating the entire thermostat casing in order to heat the thermostatic element above ambient temperature. Thus this arrangement reduces the amount of heat necessary to provide the desired set-back in temperature. This avoids any substantial heating of the thermometer. In addition, the arrangement by which the thermostatic element is effectively insulated from the cover, and in which the thermostatic element shields the thermometer element from the heater, also contributes to the prevention of false thermometer readings when the heater is energized.

In installations of the warm air type and employing a fan, it is desirable to provide for manual control of the fan during summer. In other words, it is desirable to close the thermostat circuit manually for providing fan operation, irrespective of the room temperature. In order to obtain this result, a jumper 60 (Figs. 3 and 5) is electrically connected to the fixed contact stud 14 and extends to the fixed contact stud 17, but is electrically insulated therefrom by an insulating collar 61. A second lever arm 62 is pivotally attached by a screw 63 to the rear end of stud 17 and projects beyond the base 1, preferably in symmetrical arrangement with the lever 16. As shown in Fig. 5, one corner of the jumper 60 is turned outwardly from the base as at 65. When the arm 62 is in the position shown in Fig. 5 it does not engage the jumper 60 or its turned up portion 65. Consequently with arm 62 in this position the thermostat controls in its normal manner. When manual closure of the circuit is desired, the arm 61 is moved downwardly, thus engaging the turned up portion 65 of the jumper 60, this completing the circuit from the fixed contact stud 14 to the fixed contact stud 17.

Figs. 8 to 13

Referring now to Figs. 8 to 13, these figures illustrate a preferred form of the invention in which the thermostat and timer are combined into a unitary device. In this device a main base 70, which is rectangular in shape, supports a subbase 71, which may be substantially identical with the base 1 of Fig. 1, this sub-base 71 carrying a thermostatic switching mechanism which is substantially the same as the embodiment of the invention previously described. Like parts of this thermostatic switching mechanism in both embodiments of the invention are indicated by the same reference characters. In the embodiment of the invention shown in Fig. 8, the manual switch lever 62 extends from the lower edge of the sub-base instead of from the left hand side thereof as illustrated in Fig. 1. The handle portion 34 cooperates with a curved corner portion 72 of the thermostat cover 73 for indicating the normal control point adjustment of the instrument. The curved corner portion 72 of the cover is arcuate in shape and is substantially concentric with the path of movement of the handle portion 34.

Mounted on the main base 70, beside the sub-base 71, is a timing mechanism generally indicated as 75. This timing mechanism includes a base plate 76 which is mounted in spaced relationship with the base by means of spacers 77. Mounted on the base plate 76 between this plate and the main base 70 is a small synchronous motor 78. This motor 78 drives a gear train generally indicated as 80, which in turn drives hour and minute hands 81 and 82 of a clock having dial 83 carried by an outer plate 84 suitably supported by the base plate 76. The motor 78, in addition, through suitable mechanism well known in the art, actuates a crank shaft 84 which extends rearwardly from the base plate 76, this crank shaft 84 carrying a crank arm 85 having a button 86 at its outer end. The button 86 serves to actuate a switch arm 87 which is mounted upon a U-shaped bracket 88 (Fig. 11) secured to the base plate 76. A coil spring 89 having one end attached to the switch arm 87 and its other end attached to bracket 88, serves to bias the spring arm 87 against the button 86. The switch arm 87 carries an insulating member 90, which in turn carries a spring arm 91, which at its end carries a pair of movable contacts 92 and 93 (Fig. 11) which cooperate with fixed contact studs 94 and 94' carried by an insulating panel 95 secured to the main base 70. The fixed and movable contacts just described comprise the switch 55 (Fig. 14) for controlling the set-back heater 45.

When the crank 85 is positioned by the clock mechanism as shown in Fig. 10, the movable contacts are in engagement with the fixed contacts, thus completing the circuit to the heater 45 for lowering the temperature maintained by the thermostat. Thus the position for crank 85 shown in Fig. 10 is the position of this member at night. At a predetermined time in the morning the clock mechanism causes the crank 85 to be rotated so that the button 86 does not engage the off-set outer portion of the switch arm 87. The spring 89 is thus permitted to rotate the switch arm counter-clockwise for shifting the movable contacts away from the fixed contacts. This breaks the circuit to the heater 45. Thus with the crank arm 85 in this position the thermostat maintains a room temperature which is determined solely by the adjustment of handle portion 34. At night the clock mechanism causes the crank arm 85 to again rotate to the position shown in Fig. 10, which causes the movable contacts to engage the fixed contacts, thus energizing the heater 45 for heating the bimetal element 5 above ambient temperature, this causing the thermostat to maintain a lower temperature. The clock mechanism is preferably provided with a "day" adjusting knob 96 which determines the time at which the crank 85 is rotated from the position shown in Fig. 10 to its other position providing opening of the heater switch. The clock mechanism is also provided with a "night" adjusting knob 97 which determines the time at which the clock mechanism causes the crank arm 85 to return to the position shown in Fig. 10. The mechanism within the clock for performing this action is well known in the art and forms no part of this invention.

In order to adjust the degree of set-back provided by the heater 45, a rheostat generally indicated as 53 is provided. This rheostat includes a bracket 98 which is mounted on a bearing plate 99 of the clock mechanism. This bracket preferably supports a wiper arm 100 which is rigidly attached to a lever 101 having a handle portion 101a. The wiper arm 100 contacts a resistor element 102 of usual construction, comprising a plurality of turns of high resistance wire upon a strip of insulation material. The resistor member preferably is provided at each side with mica strips 103 and 104, this assembly being secured to a bracket 105 by means of a clamping plate 106 and screws such as 107. One end of the resistor member 102 is connected to a lead 108 which leads to a terminal 109 on the terminal bracket 110 for the clock motor. The wiper 100 which contacts resistor 102 is connected to a lead 111 which leads to one terminal of heater 45, the other terminal of this heater being connected by a lead 112 which leads to the contact stud 94 on the switch or terminal plate 95, the contact stud 94' on this plate being connected to the terminal 115 on plate 95, which terminal is also connected to a terminal 116 for the clock motor by means of a lead 117. The terminal 109 for the clock motor, it will be noted, is connected by a lead 118 to a terminal 119 on plate 95. The wiring just described is the same as shown in the diagram of Fig. 14.

It will be noted that the handle portion 101a for the rheostat 53 extends through an opening in the top of the thermostat cover where it may be readily operated. It should also be noted that the thermostat cover 73 is formed with an arcuate corner portion 120, this corner portion having a curvature which is concentric with the path of travel of the handle portion 101a. The corner portion 120 is also provided with suitable indicia for indicating the number of degrees the room temperature will fall when the heater 45 is energized. Thus the handle portion 101a and the indicia cooperate to indicate the degree of setback provided by the instrument.

From the foregoing description it will be apparent that the present invention provides a simple and rugged thermostat construction for automatically maintaining one value of temperature during one period of time and a different value of temperature during another period of time, this result being obtained with a single thermostatic element having an electric heater for applying false heat thereto, this electric heater being arranged so that it does not cause the thermometer to give false readings. It will also be apparent that the present invention provides a novel and conveniently accessible arrangement for permitting ready adjustment of one or both values of temperature maintained by the device. While we have shown and described preferred forms of the invention, it will be apparent that various changes can be made by those skilled in the art without departing from the scope of the invention. It is therefore desired to be limited only by the scope of the appended claims.

What is claimed is:

1. In a temperature control device, the combination of a base, a thermostatic element pivoted on the base, switching mechanism actuated by the thermostatic element, a lever pivoted intermediate its ends on the base and having a cam surface on one end for rotating the thermostatic element about its pivot upon rotation of the lever, an electric heater clamped directly to the thermostatic element, a rheostat mounted on the base for controlling said electric heater, a second lever pivoted to the base for adjusting the rheostat, a common cover for the thermostatic element, switching mechanism and rheostat, said cover having a first arcuate portion substantially concentric with the path of movement of a portion of the first lever and a second arcuate portion substantially concentric with the path of movement of a portion of the second lever, and cooperating indicia on said cover and levers for indicating the adjustments of said levers.

2. In a temperature control device, the combination of a base, a spring hinge having one end secured to the base, a bimetal element having one end secured to the spring hinge, switching means on the base and actuated by the bimetal element, an adjusting arm attached to the bimetal element for rotating the same about said spring hinge, a lever pivoted intermediate its ends on the base and having a cam surface formed on one end thereof and a handle portion on the other end thereof, said adjusting arm engaging and being biased against said cam surface, a first electric heater mounted on the spring hinge and controlled by said switching means, said first heater supplying a relatively small amount of heat to said bimetal element by conduction through the spring hinge, a second electric heater clamped directly to said bimetal element for supplying a relatively large amount of heat to the bimetal element by direct heat conduction, a cover for the thermostatic element, said cover having an arcuate wall portion adjacent said handle portion and substantially concentric with the path of movement of said handle portion, and cooperating indicia on the cover and lever for indicating the adjustment of the lever.

3. In a temperature control device, the combination of a base, a spring hinge mounted on the base, a bimetal element having one end secured to the spring hinge, a pair of electrically connected movable contacts actuated by said bimetal element, a pair of fixed contact studs mounted on the base and adapted to be bridged or unbridged by said movable contacts, an adjusting lever for said bimetal element, said adjusting lever being pivoted intermediate its ends to the base, having a cam surface formed at one end for adjusting the bimetal element about its spring hinge and having a handle portion on its other end, a cover for the thermostatic element, said handle portion projecting beyond said cover, a jumper connected to one of said fixed contact studs and extending into close proximity to the other contact stud, and a lever pivoted to said other fixed contact stud in electrical engagement therewith and projecting outside of said cover, said second mentioned lever engaging or disengaging said jumper.

4. In a temperature control device, the combination of, a base, a pair of fixed contact studs on the base, a condition responsive element mounted on the base, a pair of electrically connected movable contacts for cooperating with said fixed contact studs for bridging or unbridging the same, said movable contacts being actuated by said condition responsive means, a jumper electrically connected to one fixed contact stud and extending into close proximity to the other fixed contact stud, and a lever pivoted to the other fixed contact stud in electrical engagement therewith, said second lever engaging or disengaging said jumper and having a handle portion extending beyond the base.

5. In a temperature control device, the combination of, a base, a pair of fixed contact studs on the base, a condition responsive element mounted on the base, a pair of electrically connected movable contacts for cooperating with said fixed contact studs for bridging or unbridging the same, said movable contacts being actuated by said condition responsive means, a jumper electrically connected to one fixed contact stud and extending into close proximity to the other fixed contact stud, and a switch member pivoted to the other fixed contact stud and adapted upon rotation about said other fixed contact stud to engage or disengage said jumper.

HOMER E. MALONE.
PAUL G. FRERER.